United States Patent [19]
Arima et al.

[11] Patent Number: 4,708,372
[45] Date of Patent: Nov. 24, 1987

[54] CROSS PIPING CONSTRUCTION

[75] Inventors: Takahisa Arima; Susumu Ninomiya, both of Yokohama; Yuji Horikawa, Tokyo; Tadasi Aoki, Yokohama, all of Japan

[73] Assignee: Kabushiki Kaisha Toshiba, Kawasaki, Japan

[21] Appl. No.: 709,207

[22] Filed: Mar. 7, 1985

[30] Foreign Application Priority Data

Apr. 28, 1984 [JP] Japan .................................. 59-87545
May 8, 1984 [JP] Japan .................................. 59-91630

[51] Int. Cl.$^4$ ............................................. F16L 41/00
[52] U.S. Cl. ..................................... 285/150; 285/156
[58] Field of Search .............. 285/150, 156; 29/157 T; 403/205

[56] References Cited

U.S. PATENT DOCUMENTS

| 408,826 | 8/1889 | Conroy | 285/150 |
|---------|--------|----------|---------|
| 784,461 | 3/1905 | Williams | 285/150 |
| 3,392,994 | 7/1968 | Moore | 285/156 |
| 3,690,702 | 9/1972 | Moore | 285/156 |

FOREIGN PATENT DOCUMENTS

3131336  2/1983  Fed. Rep. of Germany ...... 285/150

Primary Examiner—Richard J. Scanlan, Jr.
Assistant Examiner—Douglas W. Hanson
Attorney, Agent, or Firm—Oblon, Fisher, Spivak, McClelland & Maier

[57] ABSTRACT

A cross piping for a header in a boiling water reactor has a main pipe coaxially connected to a center branch pipe at a cross portion. A plurality of transversely extending branch pipes also connect to this cross portion. The cross portion has a reduced diameter with respect to the main distributor pipe. In one embodiment, the cross portion is in the shape of a hemisphere having a radius equal to that of the main distributor pipe, the center of the hemispherical surface being positioned adjacent an upstream intersection of the main distributor pipe axis and an extension of the circumferential surfaces of the branch pipes. In another embodiment, the cross portion has a throttle portion which is either a flat surface or a curved surface.

6 Claims, 21 Drawing Figures

CROSS PIPING CONSTRUCTION

BACKGROUND OF THE INVENTION

This invention relates to a cross piping construction such as the header that is provided in the recirculation system of, for example, a boiling water reactor.

Figure 1:
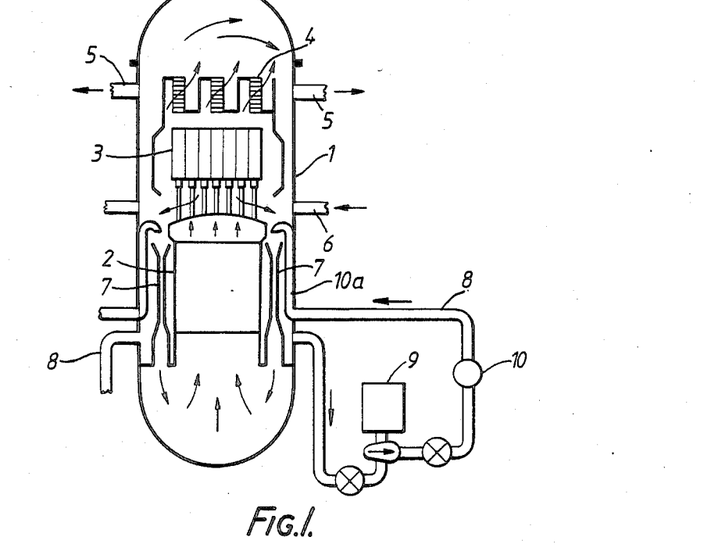
FIG. 1 is a vertical cross-section of a known boiling water reactor.

Cross piping of this type, in which the flow of a fluid is divided into flows in three directions, is used for example in the coolant recirculation system of boiling water reactors. In general, as shown in FIG. 1, a boiling water reactor has a reactor pressure vessel 1, which contains a core 2 formed of a large number of fuel assemblies etc. Steam separators 3 are arranged above this core 2. The steam separated by the steam separators 3 is supplied to a steam turbine, not shown, by means of conduits 5, after passing through steam driers 4. The condensate produced when this steam is condensed after performing work by driving the steam turbine is re-supplied to the reactor pressure vessel 1 from a feed water heater, not shown through conduits 6.

A plurality (for example, ten) of jet pumps 7 are arranged in the reactor pressure vessel 1 in such a way as to surround the core 2. The reactor water (coolant) in the reactor pressure vessel 1 is forcibly circulated by the pumping action of these jet pumps 7. For this purpose, a pair of recirculating systems 8 are provided outside the reactor pressure vessel 1 to supply the coolant in this pressure vessel 1 to the jet pumps 7. Each recirculating system 8 includes a recirculation pump 9. Downstream of this recirculating pump 9 there is provided a header 10 which distributes the reactor water to each jet pump. Thus the reactor water that is pressurized by the recirculation pump 9 is split up into separate flows by the header 10 and fed into the jet pumps 7 through respective risers.

Figure 2:
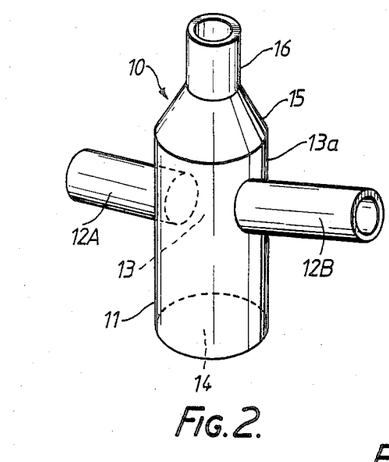
FIG. 2 is a perspective view of a known cross piping construction.
Figure 3:
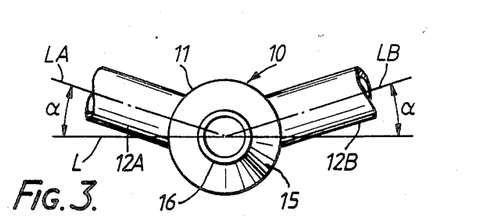
FIG. 3 is a plan view of the cross piping construction shown in FIG. 2.

The header 10 that divides the flow of the reactor water has a main distributor pipe as shown in FIG. 2 and FIG. 3, constituted by an upstream straight cylindrical pipe 11. A cross portion 13 is formed within this straight pipe 11 by connecting a pair of first and second branch pipes 12A and 12B, of smaller aperture than the upstream straight pipe 11, at the same position in the axial direction of the straight pipe 11. These two branch pipes 12A and 12B intersect the straight pipe 11 in almost diametric opposition so that the direction of the axis of one branch pipe 12A makes an obtuse angle with the direction of the axis of the other branch pipe 12B. Specifically, as shown in FIG. 3, the connection is such that the axes LA and LB of the two branch pipes 12A and 12B are offset by an angle $\alpha$ on the same side with respect to a diameter of the straight pipe 11 in a plane perpendicular to the axis of the straight pipe 11, The main distributor pipe constituting the upstream straight pipe 11 extends vertically, with its bottom end constituting an inlet portion 14, so that the reactor water flows from the bottom to the top of the pipe. The outlet portion of this straight pipe 11, downstream of the position where the branch pipes 12A and 12B are connected, is reduced in diameter by means of a reducer 15 and connected to a downstream straight pipe (center branch pipe) 16.

With a cross piping construction such as the header 10 described above, the flow delivered by the recirculation pump 9 is divided between the left and right branch pipes 12A and 12B and the center branch pipe 16. However, in the case of the flow to the center branch pipe 16, upstream of the reducer 15, this flow passes through a straight pipe portion 13a of the same bore as the upstream straight pipe 11. The consequent reduction in flow speed that occurs in this straight pipe portion 13a creates a discontinuity of flow speed, creating turbulence in the flow of reactor water.

Figure 4:
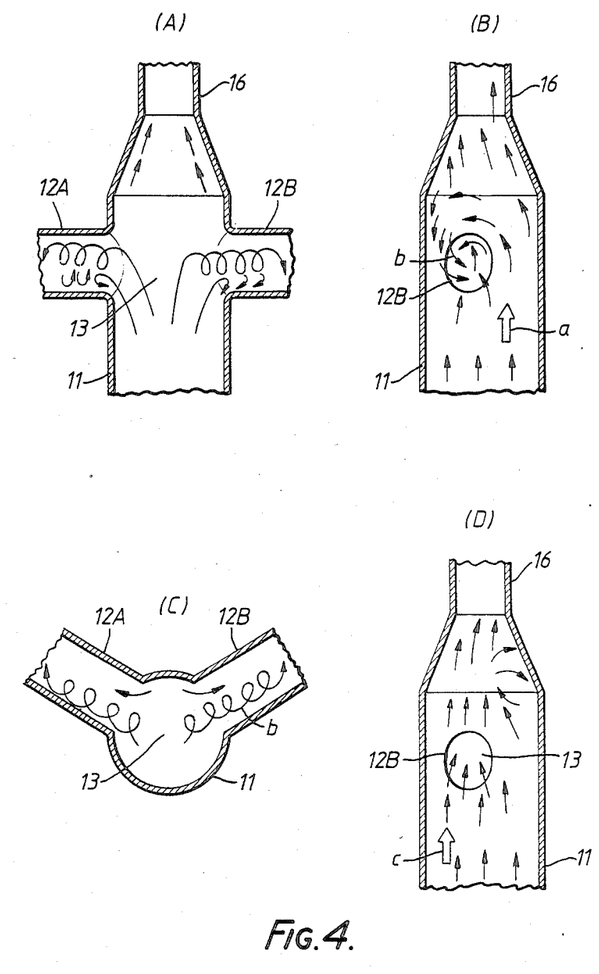
FIGS. 4(A) to 4(D) are views illustrating the fluid flow action in the known cross piping construction.

Now if the flow in the cross portion 13 were stable, without turbulence, the water would flow into the left and right branch pipes 12A and 12B smoothly. However, the main flow of reactor water is disturbed by the turbulence in the straight pipe portion 13a, causing vortex flow in the left and right branch pipe 12A and 12B. Specifically, due to the eccentric (deviant) flow $a$ of coolant (reactor water), as shown in FIGS. 4(A), 4(B) and 4(C), in the cross portion 13 and inlet portion of the downstream straight pipe 16, vortex coolant flow $b$ is created, extending from the cross portion 13 to the branch pipes 12A and 12B. Depending on variations in the flow of coolant in the cross portion 13, this vortex flow may sometimes disappear. Specifically, the vortex flow may disappear if there is a change in the eccentric flow at a position directly below the left and right branch pipes 12A and 12B, as shown in FIG. 4(D).

Such a cross piping construction was therefore subject to the problem that a stable level of branch pipe flow could not be achieved because of considerable fluctuations of coolant flow in the branch pipes caused by the irregular and repeated occurrence of vortex flow.

Occurrence of vortex flow also increases the flow resistance in the cross portion of the branch flows to the left and right and causes large flow pulsations together with generation of a considerable amount of noise. As a result, when such cross piping was used in the recirculation system of a boiling water reactor, even if the speed of the recirculating pumps was constant, the amount of recirculation flow would change depending on changes in pipe resistance resulting from the appearance or disappearance of vortex flow. Moreover, pulsations in the amount of recirculation flow due to vortex flow led to variations or slight fluctuations in reactor output.

SUMMARY OF THE INVENTION

This invention was made in consideration of the above facts. Its object is to provide a cross piping construction wherein a stable quantity of branch pipe flow can be smoothly obtained by eliminating fluctuations of flow caused by appearance and disappearance of vortex flow in the branch pipes.

A further object of this invention is to provide a cross piping construction wherein stable non-pulsating branch flows can be smoothly obtained, in the case of application to the recirculating system of a boiling water reactor, by always keeping the recirculating flow quantity stable.

In order to achieve the above objects, according to this invention there are provided a main distributor pipe through which fluid flows, a center branch pipe of smaller diameter than the main distributor pipe and connected downstream of this main distributor pipe, and a plurality of branch pipes of smaller diameter than the main distributor pipe and extending from the region of the joint of said two pipes in directions practically at right angles to the axis of the main distributor pipe. The region of the joint between said two pipes and the branch pipes is formed as a cross-shaped cross portion, and the inside surface of the cross portion is hemispherically shaped With a radius equal to that of the main distributor pipe. The center of the hemispherical surface that is formed is set in the neighborhood of the most upstream one of the points of intersection of the axis of the main distributor pipe with the extension of the inside surface of the branch pipes.

Furthermore, in order to attain the above-mentioned objects, the cross piping construction of this invention may be provided with a throttling portion of reduced diameter provided on the inside of the cross portion in the direction of said center branch pipe.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

FIG. is 8 is a plan view of the cross piping construction shown in FIG. 7.

DETAILED DESCRIPTION OF THE PREFERRED EMBODIMENTS

The description is continued below with reference to the appended drawings, which illustrate preferred embodiments of this invention.

In the description of these embodiments, parts which are the same as in the conventional construction described above are given the same reference numerals and further description of such parts is omitted.

Figure 5:
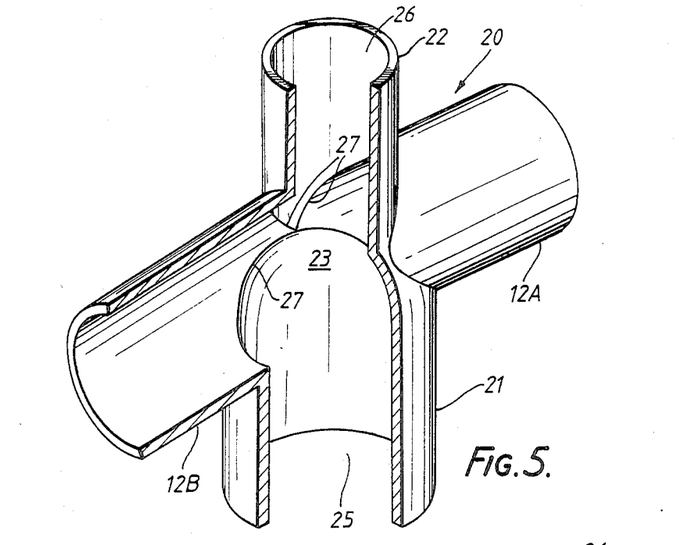
FIG. 5 is a perspective view, partly in section, with part broken away showing a cross piping construction according to this invention.
Figure 6:
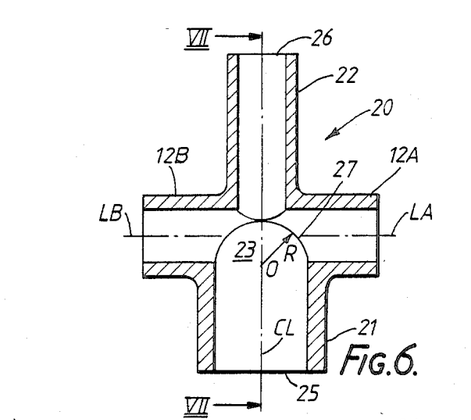
FiG. 6 is a vertical section along the line VI—VI in FIG. 8 of said cross piping construction.
Figure 8:
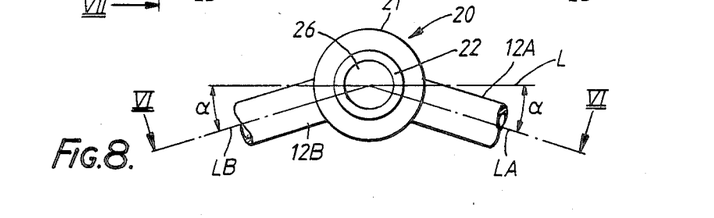

FIG. 5 and FIG. 6 show a first embodiment of this invention. Specifically, they show a header constituting an example of a cross piping construction and used in the recirculation system of a boiling water reactor. In this header 20, a downstream straight pipe constituting a center branch pipe 22 is integrally and coaxially connected to an upstream straight pipe constituting a main distributor pipe 21 through which fluid, consisting of reactor water, flows. The center branch pipe 22 has a flow path cross-sectional area of smaller aperture than the main distributor pipe 21 and a flow outlet 26. A pair of first and second branch pipes 12A and 12B are integrally connected so as to extend to the left and to the right from a cross portion 33 where the center branch pipe was connected, in directions practically at right angles to the axis of the main distributor pipe 21, forming a cross-shaped cross portion 23. The first and second branch pipes 12A and 12B also have a flow path cross-sectional area of smaller aperture than the main distributor pipe 21. The first and second branch pipes 12A and 12B are opposed to one another in practically a diametral direction. Specifically, the axes LA and LB of the first branch pipe 12A and the second branch pipe 12B intersect at an obtuse angle, making angles α on the same side, as shown in FIG. 8, with a diameter L of the main distributor pipe 21.

In order to achieve integral coupling, by forging or the like, between the smaller-aperture center branch pipe 22 and the main distributor pipe 21, the end portion of the main distributor pipe 21 is reduced in diameter at some location within the cross portion 23, and the internal surface of the cross portion 23 is worked into the shape of a hemisphere. The hemispherical surface of the cross portion 23 is formed with a radius R which is the internal radius of the main distributor pipe 21. As shown in FIG. 6, the center of this hemispherical surface is set in the neighborhood of the upstream one of the two points of intersection formed by the intersection of the axis CL of the main distributor pipe 21 with the extended inner peripheral surfaces of the left and right first and second branch pipes 12A and 12B.

Figure 9:
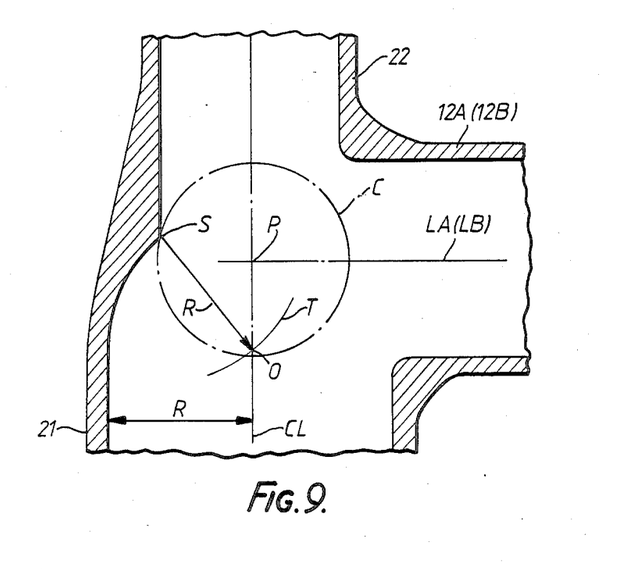
FIG. 9 is a view illustrating the principles of forming a piping cross portion in the cross piping construction.

Specifically, as shown in FIG. 9, the center O of the hemispherical surface of the cross portion 23 is found as follows. The the point of intersection P of the axes CL and LA (LB) of the main distributor pipe 21 and the left and right branch pipes 12A, 12B is found. A circle C is described about this point of intersection P, the circle C having a radius equal to the internal diameter of the branch pipe 12A or 12B. A point of intersection S of this circle C and the extended inner peripheral surface of the central branch pipe 22 is determined. An arc T is then described about this point of intersection S and of radius equal to the radius R of the main distributor pipe. O is then taken as the point where this arc T intersects the axis CL of the main distributor pipe 21. The center of the hemispherical surface of the cross portion 23 is desirably set at O.

Shaping is facilitated, and the finishing accuracy in manufacture can be guaranteed, by the hemispherical shape of the interior of the cross portion 23. The flow inlet side of the center branch pipe 22 is connected by smoothly reducing the diameter of the flow path cross-section from the main distributor pipe 21. Thus a smooth unitary connection is achieved between center branch pipe 22 and the main distrubutor pipe 21 even though the center branch pipe 22 is of smaller aperture than the main distributor pipe 21. Also, since the reduction in diameter of the cross portion 23 occurs smoothly at a hemispherical surface, there is a smooth and continuous change in the thickness of the cross portion 23 from the main distributor pipe 21 to the center branch pipe 22, thereby reducing stress concentrations in this region due to heat and fluid pressure.

Figure 7:
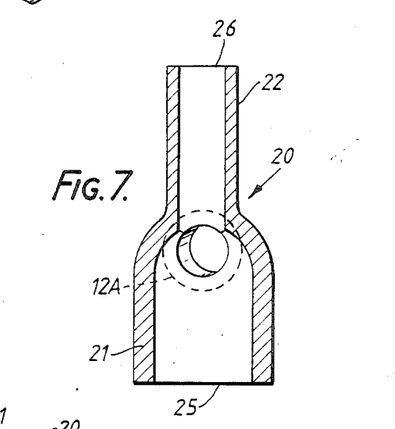
FIG. 7 is a vertical section along the line VII—VII in FIG. 6.

The flow dividing action of the cross piping construction utilized for the header piping of a boiling water reactor recirculation system will now be described with reference to FIGS. 6–8.

The reactor water within the reactor pressure vessel flows in from a flow inlet 25 of the main distributor pipe 21, flows upwards along the main distributor pipe 21, and then is gradually throttled at the cross portion 23. The central portion of the flow of reactor water rising through the main distributor pipe 21 is smoothly guided into the coaxially arranged center branch pipe 22.

The peripheral part of the flow that rises through the main distributor pipe 21 is progressively throttled in the cross portion 23. It is guided by a dike portion 27 formed in the region of the joint between the main distributor pipe 21 and the left and right first and second branch pipes 12A and 12B, and by a dike portion 27 of the hemispherical surface of the cross portion, so that the flow is divided to the left and right and smoothly guided into the first and second branch pipes 12A and 12B. The various apertures are sized so that the flow from the main distributor pipe 21 is distributed, in predetermined flow amounts, to the center branch pipe 22 and left and right branch pipes 12A and 12B, with the result that the branch flows to the various branch pipes 12A, 12B, and 22 flow in continuously, without any flow discontinuity, from the main distributor pipe 21. Non-turbulent stable branch flows can therefore always be obtained, without any occurrence of vortex flow in these branch pipes 12A, 12B and 22. The branch flows which are guided into the first and second branch pipes 12A and 12B are subdivided at locations along these pipes and fed to risers (not shown), providing uniform feed flows to jet pumps (not shown).

Figure 10:
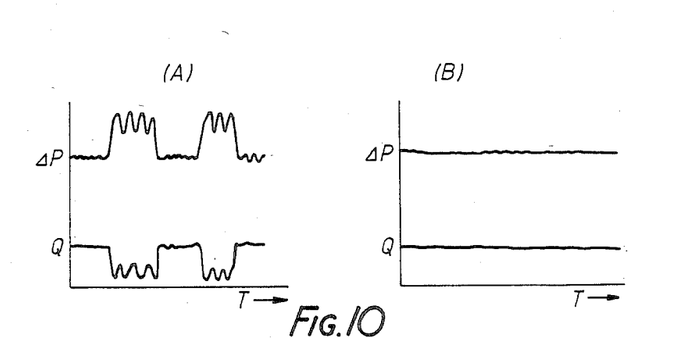
FIG. 10(A) is a graph showing the measured relationship between the pressure loss ΔP and flow quantity Q in a branch pipe in the conventional cross piping construction.
FIG. 10(B) is a graph showing the measured relationship between the pressure loss ΔP and flow quantity Q in a cross piping construction according to this invention.
Figure 11:
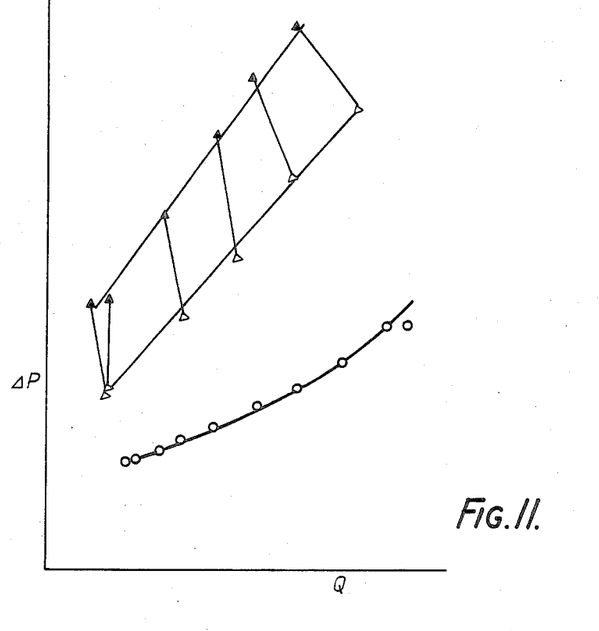
FIG. 11 is a graph showing measurements of a comparison of the relationships between pressure difference and flow amount for the conventional cross piping construction and the cross piping construction of this invention.

FIG. 10 and FIG. 11 show experimental data providing a comparison of the variation of flow quantity and pressure loss in the branch pipes in the case of a conventional cross piping construction and in the case of a cross piping construction according to this invention. In FIGS. 10(A) and 10(B), variation in the pressure loss in the branch pipe as a function of time T is represented by the pressure difference $\Delta P$. The pressure difference $\Delta P$ is for example the pressure difference between the first branch pipe 12A and the main distributor pipe 21. The flow quantity Q in FIG. 10 is the amount of fluid flowing through the first branch pipe 12A. FIG. 10(A) shows measurements obtained for the conventional cross piping construction illustrated in FIGS. 1–3. In this conventional construction, considerable pulsation occurs due to instability in the pressure loss $\Delta P$ of the branch pipe, and this pulsation results in variations in the flow amount. However, in FIG. 10(B), which shows the results measured with the cross piping construction of this invention, the pressure loss $\Delta P$ in the branch pipe is always practically constant, so a stable flow amount is obtained.

As shown in FIG. 11, in the case of the conventional cross piping construction, the pressure difference varies as between the case (shown by  ) where vortex flow occurs and the case (shown by $\Delta$) where it does not occur. This causes instability in the flow amount. In contrast, in the cross piping construction of this invention, shown by O, the relation between the pressure difference $\Delta P$ and the flow amount Q follows a practically linear curve, since vortex flow does not occur in the cross portion.

Figure 12:
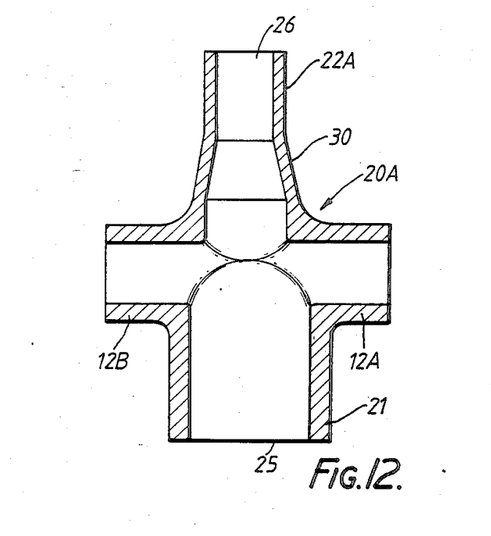
FIG. 12 is a view showing a first modification of this invention.

A first modification of this invention will now be described with reference to FIG. 12.

In this first modification, the center branch pipe 22A is provided with a tapered portion 30 so that the aperture on the inlet side of the center branch pipe 22A approaches in size the aperture of the left and right first and second branch pipes 12A and 12B. In this case also, the aperture of the branch pipes 12A, 12B and 22A is set smaller than the aperture (flow path cross-sectional area) of the main distributor pipe 21. In this case also, the same effect is obtained as in the case of the apparatus of FIG. 5.

Figure 13:
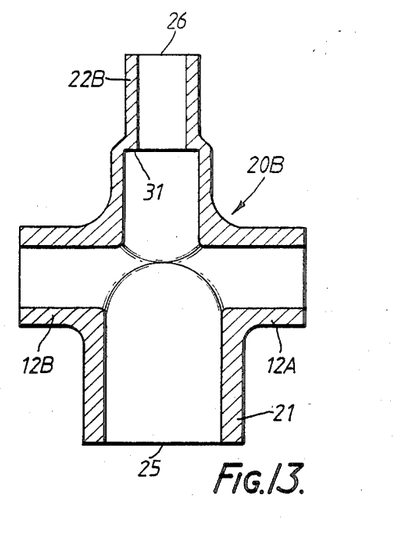
FIG. 13 is a view showing a second modification of this invention.

As an alternative to the tapered portin, in a second modification shown in FIG. 13, the center branch pipe 22B could be formed with a step 31 to provide a throttling effect.

A third modification of this invention will now be described with reference to FIGS. 14 through 17.

As shown in FIG. 14 to FIG. 17, downstream of the center axis LX in the cross portion 23, the center branch pipe 22C leading to the flow outlet 26 is reduced in diameter from the internal diameter of the upstream main distributor pipe 21 leading from the flow inlet 25, thus forming a smaller diameter throttling portion 24. The branch pipe 22C of the flow outlet 26 is coaxial with the center line of the main distributor pipe 21 of the flow inlet 25.

Figure 16:
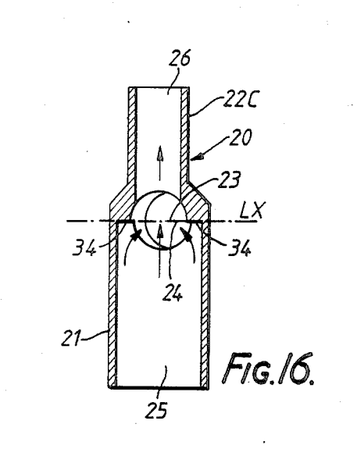
FIG. 16 is a cross-section seen along the line XVI—XVI in FIG. 14.
Figure 17:
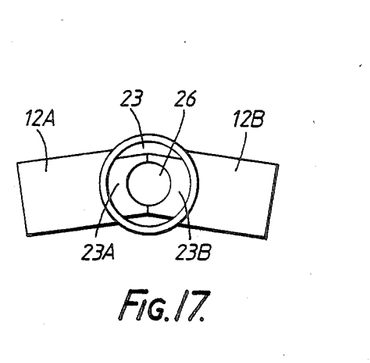
FIG. 17 is a view seen from the upstream side of FIG. 14.

In such a construction, as shown in FIG. 16 and FIG. 17, a flat surface 34 is formed outside axes LA and LB of the first and second branch pipes 12A and 12B within the upstream main distributor pipe 21 along the region of the central axis LX of the cross portion 23. The neighborhood of this flat surface 34 will be referred to as the throttling (reduced diameter) portion 24.

With a construction as described above, as coolant introduced from the flow inlet 25 of the upstream main distributor pipe 21 flows from the flow inlet 25 toward the straight pipe 22C and the throttling portion 24, the flow outside of the internal diameter of the downstream straight pipe 22C collides with the flat surface 34 and the upper faces 23A and 23B of the branch pipes in the cross portion 23, with the result that it is fed into the branch pipes 12A and 12B. The flow of coolant into these branch pipes 12A and 12B therefore suffers no interference from the coolant flowing in the direction of the outlet 26, so vortex flow cannot occur in the branch pipes 12A and 12B.

Since vortex flow does not occur in the branch pipes, the branch flow quantities are stable, making it a simple matter to control the flow quantities in the branch pipes.

Figure 18:
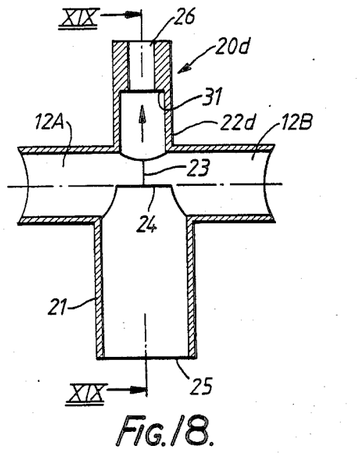
FIG. 18 is a view showing a fourth modification of this invention.
Figure 19:
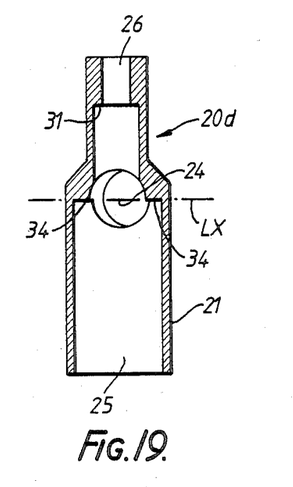
FIG. 19 is a cross-section seen along the line XIX—XIX in FIG. 18.

FIG. 18 and FIG. 19 show a fourth modification of this invention. This modification is the same as the third modification in that, downstream of the central axis LX in the cross portion 23, the center branch pipe 22d of the flow outlet 26 is formed with a throttling portion 24 of smaller internal diameter than the internal diameter of the straight pipe 21. However, it differs from the third embodiment in that, further downstream, the downstream center branch pipe 22d is formed with a step 31 where its internal diameter is further reduced. The same effects as in the embodiments described above can be obtained with this construction also.

Figures 20, 21:
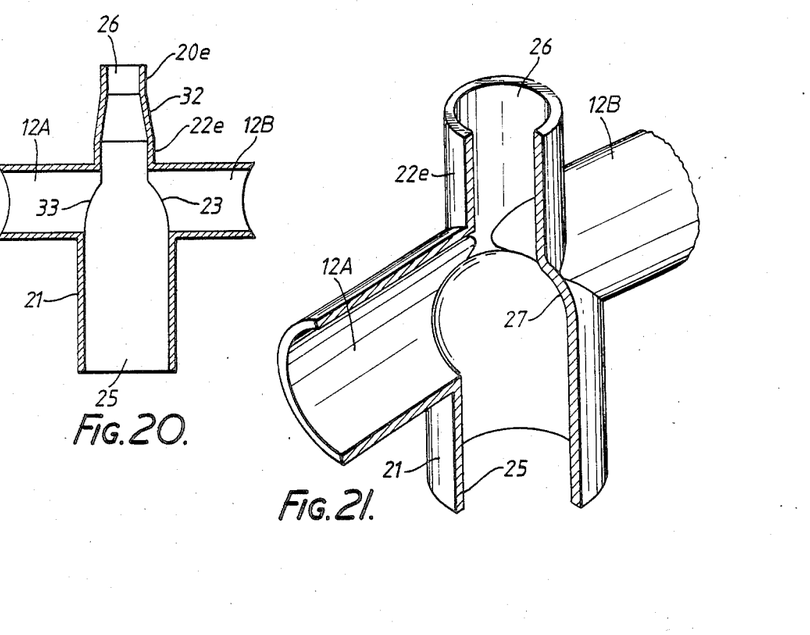
FIG. 20 is a view showing a fifth modification of this invention.
FIG. 21 is a perspective view of FIG. 20 with part cut away.

FIG. 20 shows a fifth modification of this invention. In this example, the flow outlet 26 is provided with a tapered portion 32 so that the flow between the main distributor pipe 21 and the downstream center branch pipe 22e above the cross portion 23 is even smoother, and the side surface is formed into a smoothly curved surface by elimination of the flat surface 34 of FIG. 19 so that a tapered portion 33 is formed, making the flow smoother.

FIG. 21 is a perspective view illustrating the fifth embodiment. The same effects as in the earlier embodiments can be achieved with this construction also.

Figures 14, 15:
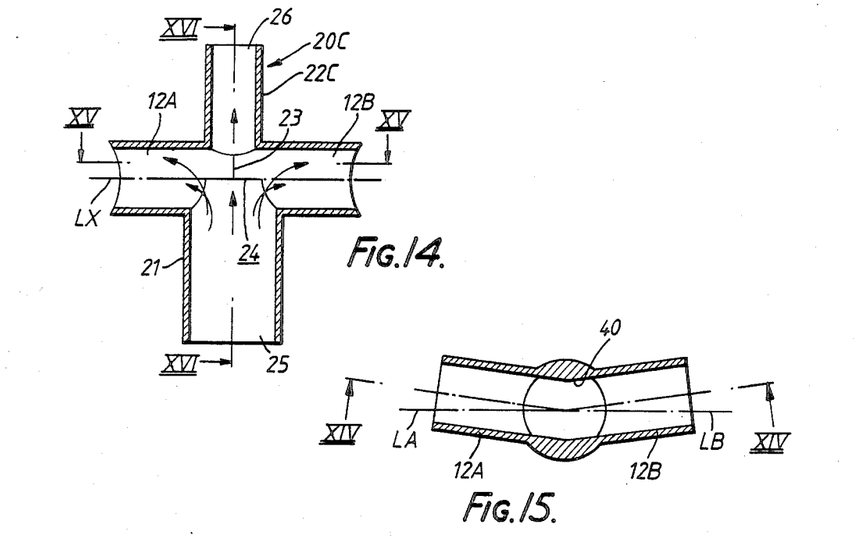
FIG. 14 is a sectional view along the line XIV—XIV in FIG. 15 showing a third modification of this invention.
FIG. 15 is a cross-section seen along the direction of the line XV—XV in FIG. 14.

In the embodiments of this invention shown in FIG. 5 through FIG. 9 and FIG. 12 through FIG. 21, the flow along the pipe wall of the main distributor pipe 21, as shown in FIG. 14, smoothly enters the first and second branch pipes 12A and 12B due to the formation of the cross portion 23 and the throttling portion 24 and the narrowness of the flow outlet 26. Specifically, as can be seen from FIG. 16, due to the formation of the throttling portion 24 at the middle of the cross portion 23 by means of the flat surface 34, the flow along the side of the pipe at the inlet 25 flows into the branch pipes 12A and 12B as shown in the Figure, because it collides with the flat surface 34. The same flow conditions are produced by the curved-surface tapered portion 33 shown in FIG. 20.

Consequently, thanks to the reduction in diameter (throttling) of the upper piping center branch pipe from the middle of the cross portion 23, the water flows in smoothly to the center branch pipe 22 and the flow outlet 26 without a change in its flow speed from the flow inlet 25. Stable flow without vortices is therefore obtained.

It should be noted that, although the described embodiments of this invention are examples in which a pair of left and right branch pipes are coupled to the joint between the main distributor pipe and a center branch pipe, three or more branch pipes could be coupled to the joint at equal intervals in the circumferential direction.

Also, although in the examples given the cross piping construction of this invention was used as the header of a boiling water reactor recirculation system, it could be applied generally to piping arrangements where flow is divided or where flows are united, for example in piping headers etc. of chemical plants of various types.

As described above, in a cross piping construction according to this invention, the region of the joint between the main distributor pipe and the center branch pipe and other branch pipes is formed as a cross-shaped cross portion. Also the inside surface of the cross portion is formed by hemispherical shaping with a radius equal to the internal radius of the main distributor pipe, the center of the hemispherical surface that is formed being positioned in the neighborhood of the most upstream one of the points of intersection of the axis of the the main distributor pipe and the extension of the inside surfaces of the branch pipes. A smooth hemispherical throttling portion is therefore formed in the cross portion from the main distributor pipe to the center branch pipe. Furthermore, since the plurality of branch pipes open into this throttling portion, and due to the fact that the internal diameter of the outlet portion straight pipe downstream of the axes of the branch pipes is smaller than the internal diameter of the upstream straight pipe, or that the downstream straight pipe is formed with a throttling portion where the aperture is made continuously or discontinuously smaller than it is on the upstream side of the region of the joint that runs straight past the branch pipes, the fluid flow through the main distributor pipe is guided by the hemispherical surface of the throttling portion so that it flows smoothly and continuously into the center branch pipe and the other branch pipes, so that there is no possibility of vortex flow occurring. The branch flow quantity is therefore stabilized, making it possible to control this branch flow quantity in a simple manner. Also vortex flow in the cross portion can be prevented from even developing. Fluid pressure loss and fluid pulsation can also be reduced to low levels, and generation of noise can be effectively prevented.

Furthermore, thanks to the hemispherical shape of the internal surface of the cross portion, the thickness of the cross portion can be changed smoothly and continuously from the main distributor pipe to the center branch pipe, conferring the economic advantage of enabling standardization in production.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A cross piping construction comprising:
   a main distributor pipe having a longitudinal axis and being connectable to a source of fluid flowing in a flow direction;
   a center branch pipe coaxially connected at a coaxial connection to said main distributor pipe at a downstream end of said main distributor pipe, said coaxial connection being at a cross portion, an inner diameter of said center branch pipe being smaller than an inner diameter of said main distribtutor pipe at said cross portion;
   a plurality of branch pipes connected to said cross portion and extending at substantially righ angles to said axis of said main distributor pipe, inner diameters of said branch pipes being smaller than said main distributor pipe inner diameter at said cross portion;
   wherein said cross portion has an internal hemispherical shape, said hemispherical shape having a radius equal to a radius of said main distributor pipe at said cross portion, a center of said hemispherical shape being located adjacent an upstream one of points of intersection of said main distributor pipe longitudinal axis and extensions of circumferential inner surfaces of said branch pipes.

2. The cross piping construction of claim 1, wherein said upstream point of intersection is defined by described a circle of radius equal to that of the branch pipes and centered at a point of intersection of the axis of the main distributor pipe and the axis of a branch pipe, finding the point of intersection of said circle with an extension of an inner circumferential surface of the center branch pipe, describing an arc having a radius equal to that of the main distributor pipe at said cross portion and centered on said point of intersection of said circle with said extension of said inner circumferential surfaces of said center branch pipe, and choosing as said upstream point of intersection the intersection of said arc with said main distributor pipe longitudinal axis.

3. The cross piping construction of claim 1 wherein the inner diameter of said center branch pipe at said cross portion is smaller than the inner diameter of each one of said plurality of branch pipe at said cross portion.

4. The cross piping construction of claim 1 wherein said plurality of branch pipe are coupled to said center branch pipe at equal intervals in the circumferential direction.

5. The cross piping combination of claim 1 wherein the inner diameters of said plurality of branch pipes at said cross-section are equal.

6. A cross-type flow dividing pipe construction comprising:

a main pipe for supplying a liquid, a pair of first branched pipes branched from an end of said main pipe and having an inner diameter smaller than that of said main pipe and intersecting said main pipe, a second branched pipe having an inner diameter at most equal to that of said first branched pipes and branched from the end of said main pipe so as to intersect said first branched pipe, and a curved guide surface defined by an inner surface of an interconnection portion between said main pipe said first branched pipes and said second branched pipe contiguous with the inner wall surface of said main pipe for guiding a layer of liquid flowing along and in the vicinity of the inner wall surface of said main pipe to flow into said first branched pipes, said curved guide surface having a cross-section which gradually decreases toward said interconnection portion.

* * * * *